(12) United States Patent
Echeverri Escobar et al.

(10) Patent No.: US 9,996,145 B2
(45) Date of Patent: Jun. 12, 2018

(54) SHARED INTERRUPT MULTI-CORE ARCHITECTURE FOR LOW POWER APPLICATIONS

(71) Applicant: NXP B.V., Eindhoven (NL)

(72) Inventors: Juan Diego Echeverri Escobar, Nijmegen (NL); Jose de Jesus Pineda de Gyvez, Eindhoven (NL)

(73) Assignee: NXP B.V., Eindhoven (NL)

( * ) Notice: Subject to any disclaimer, the term of this patent is extended or adjusted under 35 U.S.C. 154(b) by 413 days.

(21) Appl. No.: 14/083,398

(22) Filed: Nov. 18, 2013

(65) Prior Publication Data
US 2015/0143141 A1  May 21, 2015

(51) Int. Cl.
G06F 1/00  (2006.01)
G06F 1/32  (2006.01)
G06F 13/24  (2006.01)

(52) U.S. Cl.
CPC .......... *G06F 1/3296* (2013.01); *G06F 1/3243* (2013.01); *G06F 13/24* (2013.01); *Y02B 60/1239* (2013.01); *Y02B 60/1285* (2013.01)

(58) Field of Classification Search
CPC ........ G06F 1/3296; G06F 3/24; G06F 1/3243; G06F 13/24; Y02B 60/1239; Y02B 60/1285
See application file for complete search history.

(56) References Cited

U.S. PATENT DOCUMENTS

| 6,237,058 B1* | 5/2001 | Nakagawa | G06F 13/24 710/260 |
|---|---|---|---|
| 7,206,950 B2* | 4/2007 | Tanaka | G06F 1/04 713/300 |
| 7,882,369 B1* | 2/2011 | Kelleher | G06F 1/3203 345/419 |
| 2003/0120702 A1* | 6/2003 | Jahnke | G06F 9/4812 718/102 |
| 2006/0225002 A1* | 10/2006 | Hassoun | G06F 17/505 716/104 |
| 2008/0162764 A1 | 7/2008 | Tang | |
| 2009/0228625 A1* | 9/2009 | Kulkarni | G06F 9/4812 710/263 |
| 2010/0117579 A1* | 5/2010 | Culbert | G05D 23/2442 318/471 |
| 2014/0052879 A1* | 2/2014 | Shimizuno | G06F 13/24 710/50 |
| 2014/0181351 A1 | 6/2014 | Fatemi et al. | |

(Continued)

FOREIGN PATENT DOCUMENTS

CN  101000596 A  7/2007
CN  101187908 A  5/2008

(Continued)

OTHER PUBLICATIONS

Analog devices, Charge Pump Regulator for Color TFT Panels, 2006, http://www.analog.com/media/en/technical-documentation/data-sheets/ADM8839.pdf, Revision C, figure 1 and general description.*

(Continued)

*Primary Examiner* — Austin Hicks

(57) ABSTRACT

A multicore architecture is configured to exploit explicit task parallelism to save power by sharing interrupt sources that trigger independent tasks.

10 Claims, 5 Drawing Sheets

(56) References Cited

U.S. PATENT DOCUMENTS

2014/0181555 A1\* 6/2014 Bodas ................... G06F 9/4812
　　　　　　　　　　　　　　　　　　　　　713/323
2014/0304439 A1\* 10/2014 Elahi ....................... G06F 13/24
　　　　　　　　　　　　　　　　　　　　　710/51

FOREIGN PATENT DOCUMENTS

| CN | 102063335 A | 5/2011 |
|----|-------------|--------|
| CN | 102117261 A | 7/2011 |

OTHER PUBLICATIONS

Chandrakasan, A. P. et al. "Low-Power CMOS Digital Design", IEEE Journal of Solid-State Circuits, vol. 27, No. 4, pp. 473-484 (Apr. 1992).
"NXP's New Dual-Core Cortex-M4 and M0 MCU Redefines Digital Signal Control", NXP, 2 pgs, retrieved from the internet at: http://www.nxp.com/news/press-releases/2010/11/nxp-s-new-dual-core-cortex-m4-and-m0-mcu-redefines-digital-signal-control.html (2011).
"MPC5676R: Qorivva 32-bit MCU for Powertrain Applications", Freescale, 1 pg, retrieved from the internet at: http://www.freescale.com/webapp/sps/site/prod_summary.jsp?code=MPC5676R (2011).

\* cited by examiner

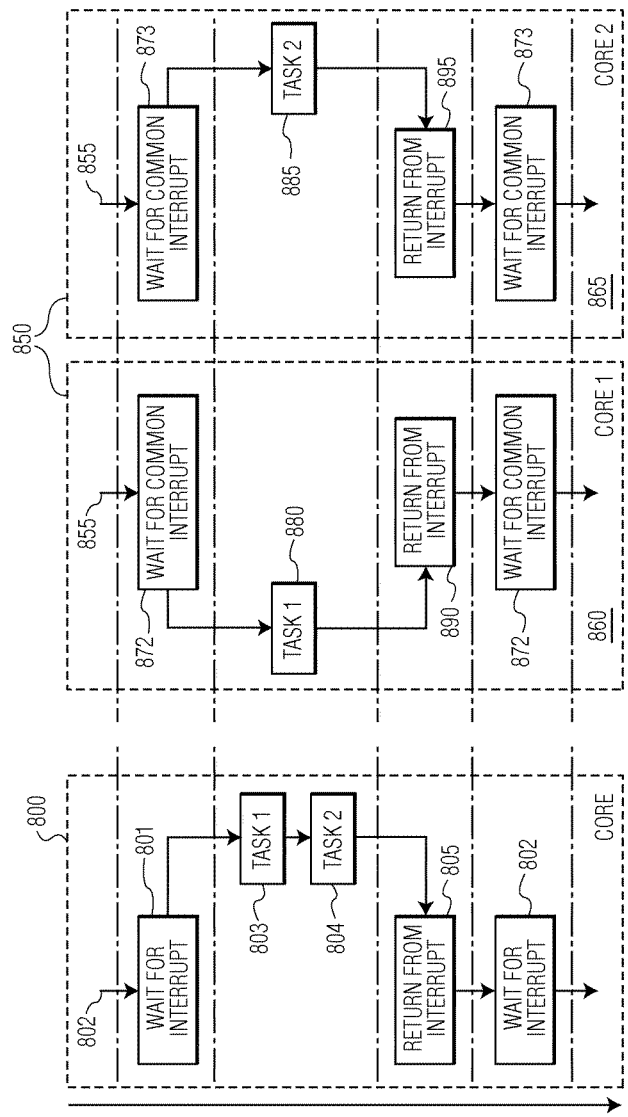

SHARED INTERRUPT MULTI-CORE ARCHITECTURE FOR LOW POWER APPLICATIONS

BACKGROUND

The use of parallel architecture in processors is a typical way to reduce power consumption without a performance penalty at the architectural level, see for example, "Low Power Digital CMOS Design, IEEE Journal of Solid State Circuits, pp. 473-484, April 1992. For a given performance level, the use of parallelism allows a task to be distributed and the frequency and voltage can typically be scaled down without performance losses.

There is a trend for multi-core architecture to be used even in small microcontrollers. The challenge is typically how to effectively and advantageously use the additional resources that are available in a multi-core architecture.

Many applications in the area of small microcontrollers are typically based on an interrupt that triggers the execution of multiple tasks. FIG. 1 shows system 100 that uses multiple peripherals connected to microcontroller (MCU) 110. In a given time interval, e.g. 1 ms, MCU 110 checks sensor 115, General Packet Radio Service (GPRS) modem 120 connectivity, Global Positioning System (GPS) 125 position, keyboard 140 for input, addresses actuator 130 and updates display 135 if needed. Typically, system 100 is implemented by setting up a timer (not shown) so that when the timer interrupt occurs, all tasks are executed. Explicit parallelism exists in system 100. For example, the tasks of checking sensor 115 and addressing actuator 130 are independent of checking GPRS modem 120 connectivity and GPS 125 position.

However, typical microcontrollers do not provide for the capability of distributing tasks to different cores for execution. The microcontroller code needs to be written to manage all the tasks at the same time while utilizing only one resource. If some tasks can be executed in a second core but still share common memory with the first core, the implementation is simplified while the power consumption may be reduced through voltage and frequency scaling without performance losses.

FIG. 2 shows typical multi-core architecture 200 where core 210, core 220 . . . and core 230 are connected and share common memory 240. Core 210 has peripherals 250, core 220 has peripherals 255 . . . and core 230 has peripherals 260 where each core 210, 220 . . . and 230 has its own memory 265, 270 . . . and 275, respectively.

BRIEF DESCRIPTION OF THE DRAWINGS

FIG. 8a shows program flow in an embodiment accordance with the prior art.

FIG. 8b shows program flow in an embodiment accordance with the invention.

DETAILED DESCRIPTION

Figure 1:
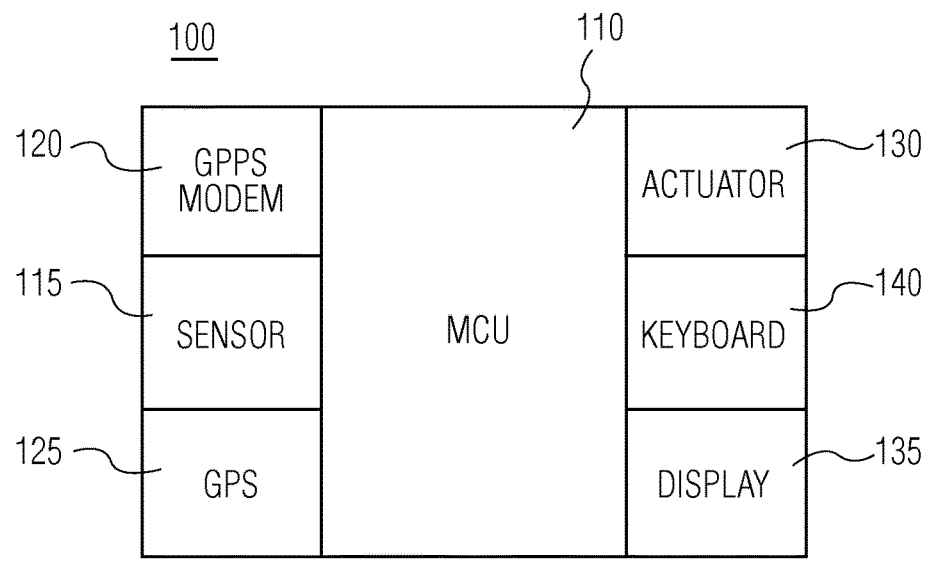
FIG. 1 shows a prior art microcontroller with peripheral arrangement.
Figure 2:
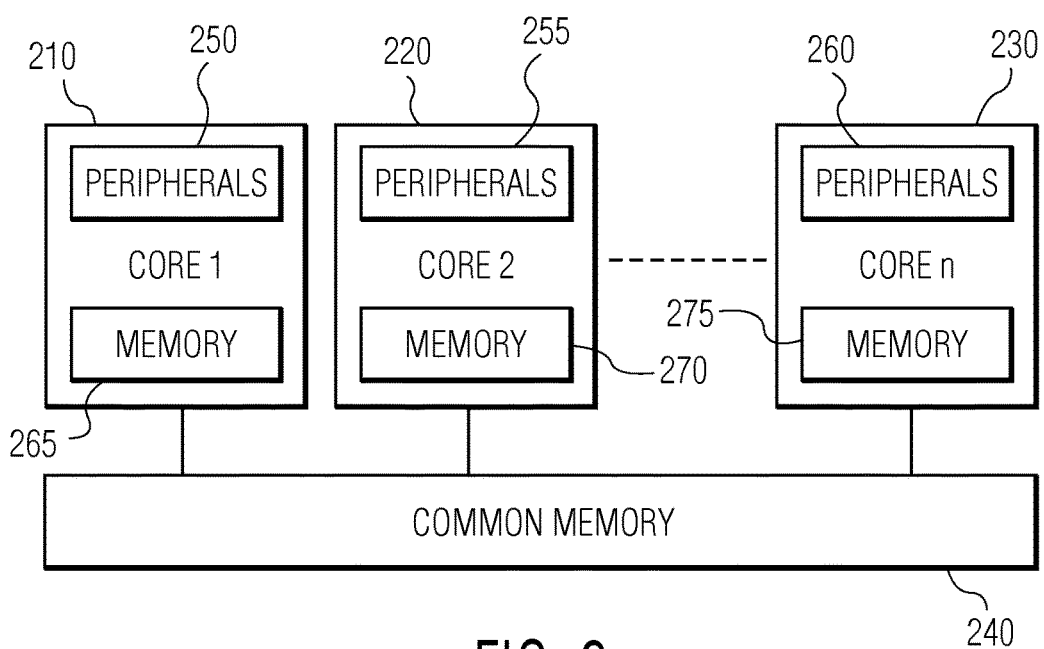
FIG. 2 shows a prior art embodiment of a prior art multi-core microcontroller.
Figure 3:
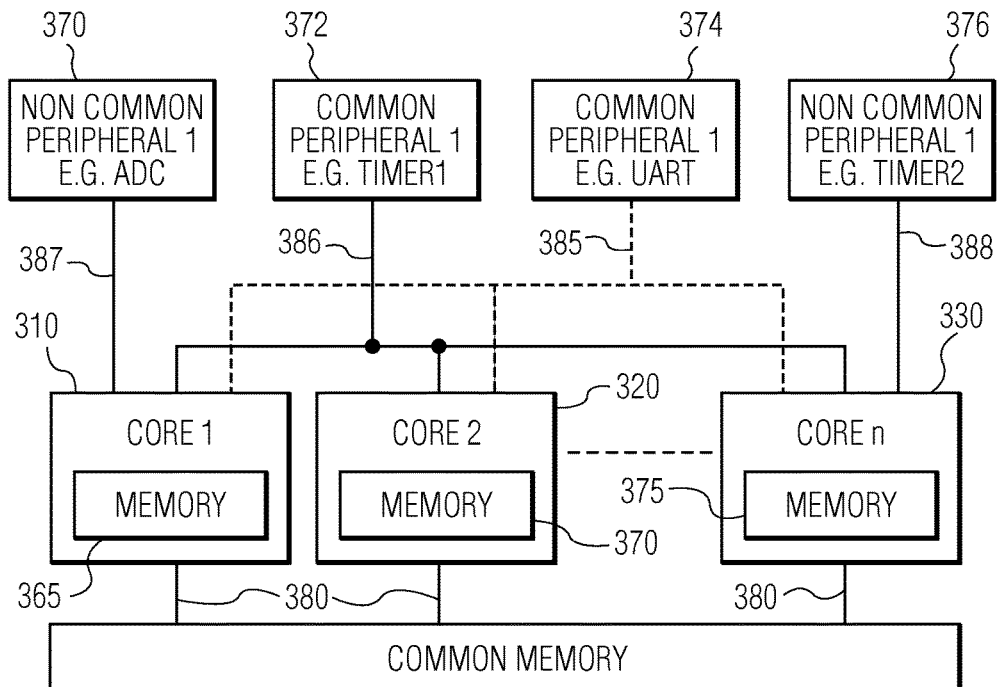
FIG. 3 shows an embodiment in accordance with the invention.

FIG. 3 shows an exemplary embodiment of common multi-core architecture 300 in accordance with the invention with cores 310, 320 . . . and 330. Core 310 contains memory 365, core 320 contains memory 370 . . . and core 330 contains memory 375. Cores 310, 320 . . . and 330 connect to common memory 340 over common memory bus 380. Cores 310, 320 . . . and 330 are each connected to common peripherals 372 and 374 such as, for example, a timer, a Universal Asynchronous Receiver/Transmitter (UART), a General Purpose Input/Output (GPIO), a Serial Peripheral Interface Bus (SPI), Inter-Integrated Circuit bus (I2C), Analog-to-Digital Converter (ADC) or Digital-to-Analog Converter (DAC) by common interrupt lines 386 and 385, respectively. In the exemplary embodiment shown in FIG. 3, non-common peripherals 370 and 376 such as a timer or Analog-to-Digital Converter (ADC) are connected to cores 310 and 330 by dedicated interrupt lines 387 and 388, respectively. This exemplary embodiment allows distribution of tasks triggered from common peripherals 372 and 374 to be distributed over an arbitrary number of "n" cores, cores 310, 320 . . . and 330 and allows performance improvement or reduction of the power consumption through voltage scaling.

Figure 4A:
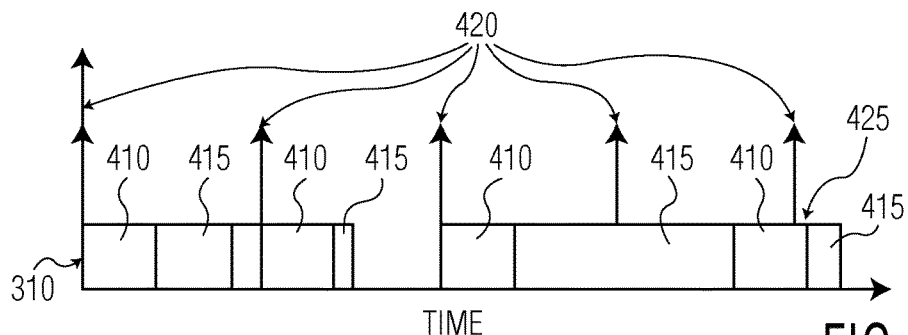
FIG. 4a shows task execution in accordance with the prior art.
Figure 4B:
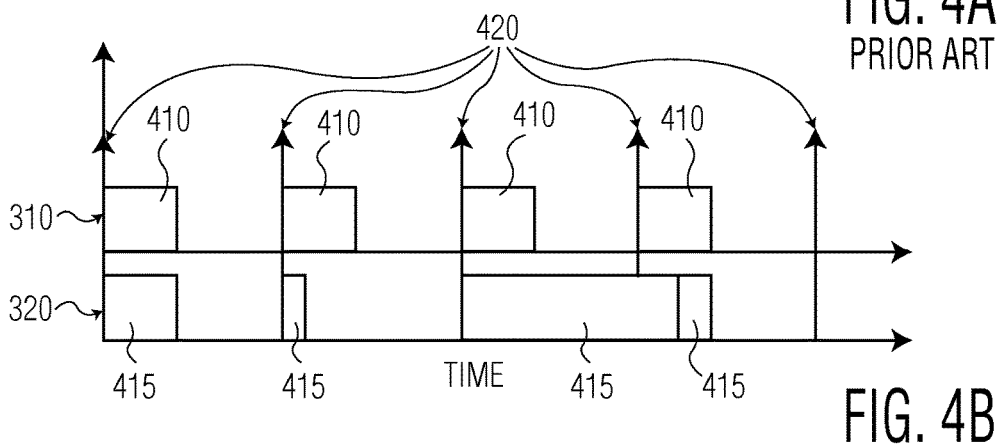
FIG. 4b shows task execution in an embodiment in accordance with the invention.

An exemplary embodiment in accordance with the invention uses "n" equal two cores with cores 310 and 320 (see FIG. 3). With respect to FIG. 4a, an application is running on core 310 where between each timer tick 420, real time task 410 needs to be executed as well as non-real time task 415. However, using only core 310, real time task 410 is not completed in the required time at time 425 because real time task is still executing at time 425. In an embodiment in accordance with the invention, core 310 can be selected to execute real time tasks 410 as shown in FIG. 4b and core 320 is selected to execute non-real time tasks 415. Hence, increased performance is provided by the addition of core 320. Note that in accordance with the invention there is no requirement that either task be a real time task as shown in the example.

Figure 5A:
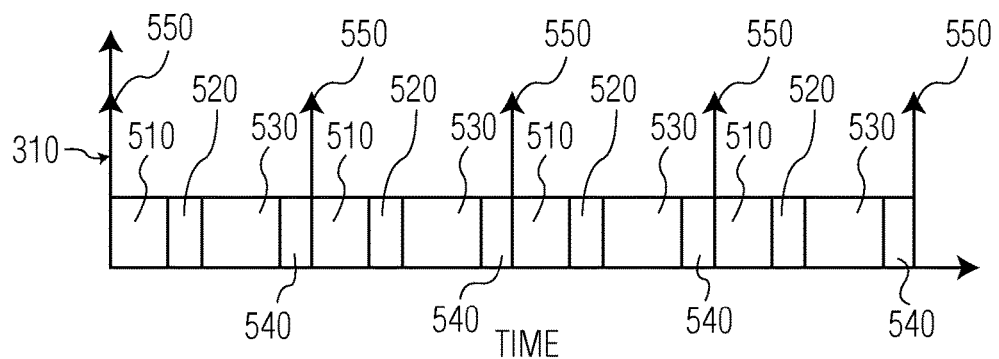
FIG. 5a shows task execution in accordance with the prior art.

FIG. 5a shows an application running on core 310 with tasks 510, 520, 530 and 540 to be executed between each timer tick 550. The dynamic power, $P_{dynamic}$, required for the application running on core 310 is modeled by Eq. (1):

$$P_{dynamic} = C_{eff} F V^2 \qquad (1)$$

where $C_{eff}$ is the total effective capacitance being switched per clock cycle, F is the running frequency of the application and V is the operating voltage. $C_{eff}$ can be typically determined through post-layout simulation using standard electronic design automation tools.

Figure 5B:
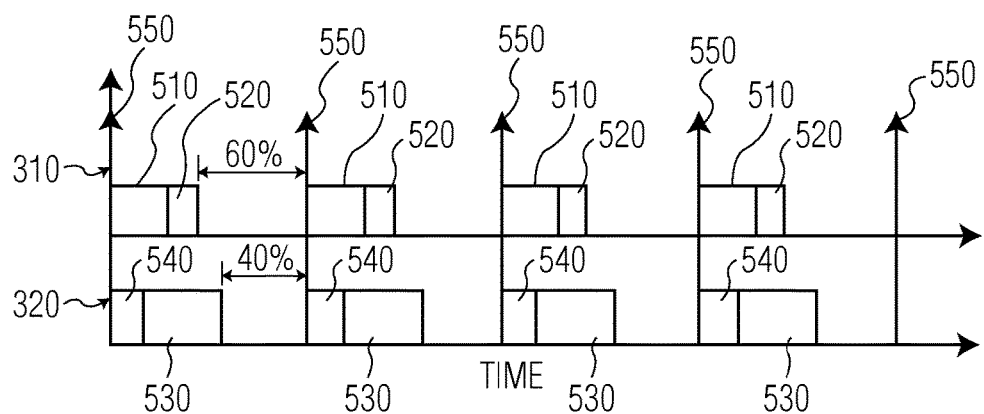
FIG. 5b shows task execution in an embodiment in accordance with the invention.

FIG. 5b shows that after tasks 540 and 530 are moved to core 320, performance is higher than required. In particular, idle time for core 310 is 60% and idle time for core 320 is 40%. This performance excess can be used to save power. The operating frequency of both core 310 and 320 can be lowered so that core 310 fulfills the timing requirements for both tasks 510 and 520 while core 320 fulfills the timing requirements for both tasks 530 and 540. The appropriate operating frequency and voltage in accordance with the invention may be determined through user task profiling, for example. In this case, the user runs the desired application and determines the length of time required to execute the tasks. Then using the phase lock loop (PLL) and the programmable low-dropout (LDO) regulator in each core, the user can set the appropriate voltage and operating frequency. Note that this approach requires each core to have both a PLL and LDO.

The total dynamic power $P_{dynamic} = P_{core\ 310} + P_{core\ 320}$ required for the application running on both core 310 and 320 is modeled by Eq. (2) below (assuming no power consumption occurs when a core is idle) with reference to the example shown in FIG. 5b where core 310 is active 40% of the time and core 320 is active 60% of the time:

$$P_{dynamic} = 0.4(C_{eff}FV^2)_{core310} + 0.6(C_{eff}FV^2)_{core320} \quad (2)$$

where Eq. (2) assumes there is no overhead in connecting cores 310 and 320. The coefficients, here "0.4" and "0.6", depend on how individual tasks are distributed between core 310 and core 320, affecting idle time. The coefficients are determined by the execution time of the tasks and the coefficients change in dependence on the length of the tasks.

Figure 6:
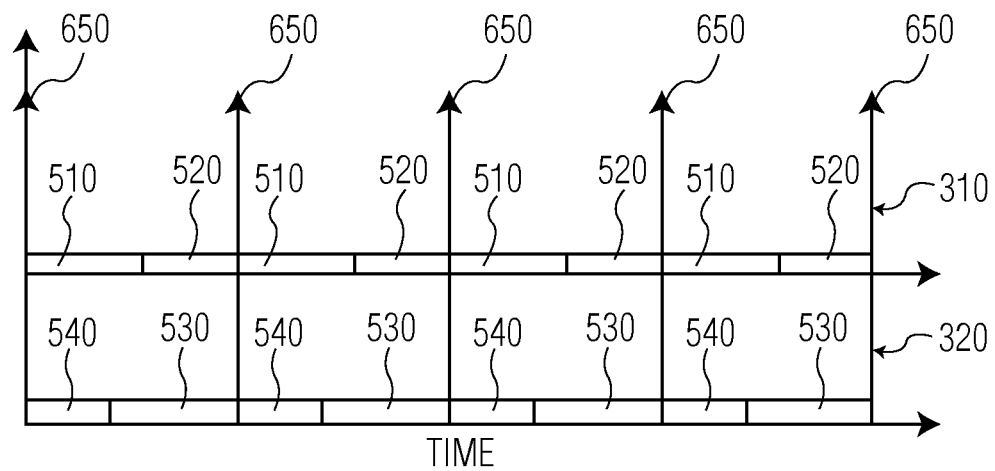
FIG. 6 shows task execution in an embodiment in accordance with the invention.

If the running frequency is lower, the voltage can be scaled to match the new running frequency as shown in FIG. 6 with timer ticks 650. In the case shown in FIG. 6, the power required for running the application is modeled as:

$$P_{dynamic(scaled)} = C_{eff}(0.4F)_{core310}V^2_{new1} + C_{eff}(0.6F)_{core320}V^2_{new2} \quad (3)$$

where $V_{new1}$ and $V_{new2}$ can be determined using a normalized delay vs. voltage relationship for a given semiconductor technology (e.g. 90 nm, 60 nm etc.). For this, a simple alpha-power model described by Eq. (4) below may be used (see, for example, "Alpha-Power Law MOSFET Model and its Applications to CMOS Inverter Delay and Other Formulas", IEEE Journal of Solid State Circuits, pp. 584-594, April (1990), incorporated by reference in its entirety):

$$D(V) \propto \frac{V}{(V - V_{th})^\alpha} \quad (4)$$

where $V_{th}$ is the threshold voltage of the transistor and $\alpha$ is the parameter associated with a specific semiconductor process technology (e.g. 90 nm, 60 nm etc.). Assuming that V=1.2 volts, $V_{th}$=0.43 volts and $\alpha$=2.2 which corresponds to 90 nm technology, the normalized delay with respect to the delay at 1.2 volts is modeled by:

$$D_{norm}(V_{new}) = \frac{D(V_{new})}{D(V)} = \frac{V_{new}(V - V_{th})^\alpha}{V(V_{new} - V_{th})^\alpha} \quad (5)$$

Figure 7:
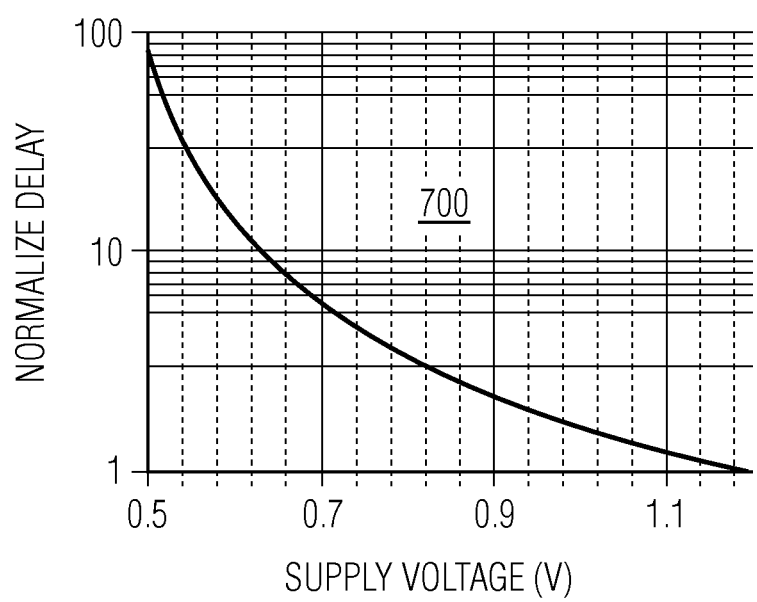
FIG. 7 shows the normalized delay versus supply voltage in accordance with the invention.

Plot 700 for Eq. (5) is shown in FIG. 7 for $\alpha$=2.2.

For core 310, the running frequency is scaled down to 40% of the original frequency F for a particular task. Using FIG. 7 with a normalized delay (where normalized delay is defined as the ratio between the new clock period and the old clock period) of 2.5 (1.0/0.4) for core 310, the supply voltage, $V_{new1}$, is given by 0.86 volts. Similarly, for core 320 the running frequency is scaled down to 60% of the original frequency F. Using FIG. 7 with a normalized delay of 1.66 (1.0/0.6), the supply voltage. $V_{new2}$, is given by 0.98 volts.

The power savings factor $P_{savings}$ is modeled by Eq. (6) below (assuming insignificant power leakage):

$$P_{savings} = \frac{P_{dynamic}}{P_{dynamic(scaled)}} = \frac{V^2}{0.4\ V^2_{new1} + 0.6\ V^2_{new2}} \quad (6)$$

with V=1.2 volts, $V_{new1}$=0.86 volts and $V_{new2}$=0.98 volts and gives $P_{savings}$=1.65 as the power savings factor.

In accordance with the invention, the power savings can be achieved if both cores 310 and 320 have a PLL (not shown) and a programmable LDO (not shown) (note that the power supply may be external to cores 310 and 320 in which case there is an external programmable LDO adjustable by the user), a DC-DC converter (typically for higher loads) or a switch capacitor converter (typically for lower loads). With respect to the example discussed above, after the user determines that the task running in core 310 executes for 40% of the time (with the idle time being 60%), the user sets up division of the output frequency by 2.5 using the configuration registers of the PLL integrated into core 310. Then, using the programmable LDO in core 310, the user sets the voltage to 0.86 volts for core 310. The same setup procedure is executed in core 320, but in this case the PLL integrated into core 320 is set up to divide the output frequency by 1.66 and the programmable output voltage is set to 0.98 volts using the programmable LDO in core 320. After the core setup is completed, the task can be executed with the appropriate power savings factor, $P_{savings}$.

The analysis above for power savings factor, $P_{savings}$, may be extended to n cores as modeled by Eq. (7):

$$P_{savings} = \frac{V^2}{\sum_{i=1}^{n} l_i V^2_{new_i}} \quad (7)$$

where $l_i$ is the frequency scaling factor for a task running on processor i and $V_{new_i}$ is the voltage that corresponds to the new operating frequency.

For example, a multi-core system having 10 cores where each core now runs at $1/10^{th}$ of the original operating frequency results in the supply voltage for each core being reduced to 0.63 volts (see FIG. 7). Using Eq. (7) this gives a power savings factor, $P_{savings}$, of 3.62 where n=10, V=1.2 volts, $l_i$=0.1 and $V_{new_i}$=0.63 volts.

FIGS. 8a and 8b show how program flow is typically modified by rewriting the program code to exploit the parallelism in a two core architecture in accordance with the invention to achieve power savings. In FIG. 8a, single core microcontroller 800 is in "wait for interrupt" state 801 when it receives "interrupt" 802. In response to interrupt 802, microcontroller 800 sequentially executes task 803 and task 804. Upon completion of task 804, "return from interrupt" instruction 805 is executed and microcontroller 800 returns to "wait for interrupt" state 801.

In FIG. 8b, dual core microcontroller 850 has cores 860 and 865 which are both in "wait for common interrupt" states 871 and 873, respectively, when "common interrupt" 855 is received by cores 860 and 865. In response to "common interrupt" 855, core 860 executes task 880 while core 865 executes task 885. Upon completion of task 880, "return from interrupt" instruction 890 is executed and core 860 returns to "wait for interrupt" state 872 while upon completion of task 885, "return from interrupt" instruction 895 is executed and core 865 returns to "wait for interrupt" state 873.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A microcontroller system comprising:
a microcontroller having a plurality of cores, each of the plurality of cores having an interrupt controller, an operating frequency and voltage; and
a common peripheral electrically coupled to each of the plurality of cores by a common interrupt line that connects directly between the common peripheral and each of the plurality of cores such that a common interrupt is received in parallel at each of the plurality of cores, the interrupt controller of each of the plurality of cores handling the common interrupt received in parallel at each of the plurality of cores from the common peripheral over the common interrupt line such that a first task signaled by the common interrupt is handled in parallel with a second task signaled by the common interrupt, wherein the first task is a real time task and the second task is a non-real time task, by having the first task signaled by the common interrupt running on a first one of the plurality of cores while the second task signaled by the common interrupt is running in parallel on a second one of the plurality of cores, wherein the operating frequency and voltage of the first one of the plurality of cores and the operating frequency and voltage of the second one of the plurality of cores are scaled down relative to a case in which the first task and the second task signaled by the common interrupt are handled by the same core of the plurality of cores to reduce power consumption.

2. The microcontroller system of claim 1 wherein the plurality of cores is two.

3. The microcontroller system of claim 1 wherein one of the plurality of cores comprises a switch capacitor converter.

4. The microcontroller system of claim 1 wherein one of the plurality of cores comprises a programmable low-dropout regulator.

5. The microcontroller system of claim 1 wherein the operating voltage of the first and second one of the plurality of cores is scaled down according to a normalized delay versus a voltage relationship for a specific semiconductor process technology.

6. The microcontroller system of claim 1 wherein the common peripheral is selected from the group consisting of a timer, a UART and an analog to digital converter.

7. The microcontroller system of claim 1 wherein a power supply is external to each of the plurality of cores.

8. The microcontroller system of claim 1 wherein a user determines the scaled down voltage and operating frequency for the second task.

9. A method comprising:
providing a microcontroller having a plurality of cores, each of the plurality of cores having an interrupt controller, an operating frequency and voltage;
providing a common peripheral electrically coupled to each of the plurality of cores by a common interrupt line that connects directly between the common peripheral and each of the plurality of cores;
receiving a common interrupt at each of the plurality of cores in parallel via the common interrupt line that connects directly between the common peripheral and each of the plurality of cores; and
handling, by the interrupt controller of each of the plurality of cores the common interrupt that is received at each of the plurality of cores in parallel from the common peripheral over the common interrupt line such that a first task signaled by the common interrupt is handled in parallel with a second task signaled by the common interrupt, wherein the first task is a real time task and the second task is a non-real time task, by having the first task signaled by the common interrupt running on a first one of the plurality of cores while the second task signaled by the common interrupt is running in parallel on a second one of the plurality of cores, wherein the operating frequency and voltage of the first one of the plurality of cores and the operating frequency and voltage of the second one of the plurality of cores are scaled down to a reduced operating frequency and a reduced operating voltage relative to a case in which the first task and the second task signaled by the common interrupt are handled by the same core of the plurality of cores.

10. A method for processing an interrupt in a microcontroller system that includes a plurality of cores, the method comprising:
receiving a common interrupt at a first core of the microcontroller system and at a second core of the microcontroller system in parallel via a common interrupt line that connects directly between a common peripheral and each of the first core of the microcontroller system and the second core of the microcontroller system;
executing a first task signaled by the common interrupt at the first core; and
executing a second task signaled by the common interrupt at the second core;
wherein the first task and the second task are executed in parallel;
wherein the first task is a real time task and the second task is a non-real time task;
wherein the operating frequency and voltage of the first core and the operating frequency and voltage of the second core are scaled down to a reduced operating frequency and a reduced operating voltage relative to a case in which the first task and the second task signaled by the common interrupt are handled by a single core.

* * * * *